(12) United States Patent
Ravi et al.

(10) Patent No.: US 10,982,532 B2
(45) Date of Patent: Apr. 20, 2021

(54) METHOD AND APPARATUS FOR IDENTIFYING FLUIDS BEHIND CASING

(71) Applicant: Halliburton Energy Services, Inc., Houston, TX (US)

(72) Inventors: Krishna M. Ravi, Kingwood, TX (US); Li Gao, Katy, TX (US); Christopher Lee Stokely, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 219 days.

(21) Appl. No.: 15/745,703

(22) PCT Filed: Aug. 26, 2015

(86) PCT No.: PCT/US2015/046877
§ 371 (c)(1),
(2) Date: Jan. 17, 2018

(87) PCT Pub. No.: WO2017/034558
PCT Pub. Date: Mar. 2, 2017

(65) Prior Publication Data
US 2018/0238167 A1    Aug. 23, 2018

(51) Int. Cl.
*E21B 47/005* (2012.01)
*E21B 47/107* (2012.01)
(Continued)

(52) U.S. Cl.
CPC ............ *E21B 47/107* (2020.05); *E21B 33/14* (2013.01); *E21B 47/005* (2020.05); *G01V 1/226* (2013.01);
(Continued)

(58) Field of Classification Search
CPC .... E21B 47/101; E21B 33/14; E21B 47/0005; G01V 1/226; G01V 1/40
(Continued)

(56) References Cited

U.S. PATENT DOCUMENTS

| 4,347,747 A | 9/1982 | Krishnaswamy |
| 6,354,147 B1 | 3/2002 | Gysling et al. |

(Continued)

FOREIGN PATENT DOCUMENTS

| WO | 2009144585 | 12/2009 |
| WO | 2014100272 A1 | 6/2014 |
| WO | 2015026424 A1 | 2/2015 |

OTHER PUBLICATIONS

Alford et al., Development and Field Evaluation of the Production Surveillance Monitor, Journal of Petroleum Technology, SPE 6095, pp. 160-166, 1978.
(Continued)

*Primary Examiner* — John Fitzgerald
*Assistant Examiner* — Rodney T Frank
(74) *Attorney, Agent, or Firm* — Thomas Rooney; C. Tumey Law Group PLLC

(57) ABSTRACT

Determining a type of annular material in a wellbore comprises measuring an acoustic noise of one or more reference materials and thereby generating a corresponding one or more acoustic profiles, monitoring the annular material with an acoustic sensor positioned in the wellbore and thereby obtaining an acoustic response of the annular material, comparing the acoustic response with the one or more acoustic profiles using a processor communicably coupled to the acoustic sensor, and characterizing the annular material based on the comparison of the acoustic response and the one or more acoustic profiles.

20 Claims, 7 Drawing Sheets

(51) Int. Cl.
   *G01V 1/40* (2006.01)
   *E21B 33/14* (2006.01)
   *G01V 1/22* (2006.01)

(52) U.S. Cl.
   CPC ........ *G01V 1/40* (2013.01); *G01V 2210/1216* (2013.01)

(58) Field of Classification Search
   USPC ...................................................... 73/152.19
   See application file for complete search history.

(56) References Cited

U.S. PATENT DOCUMENTS

| | | | |
|---|---|---|---|
| 6,758,277 B2 | 7/2004 | Vinegar et al. | |
| 6,874,361 B1 | 4/2005 | Meltz et al. | |
| 7,881,884 B2 | 2/2011 | Perry et al. | |
| 7,940,189 B2* | 5/2011 | Brown ................ | F16K 37/0075 340/621 |
| 8,505,625 B2 | 8/2013 | Ravi et al. | |
| 8,636,063 B2* | 1/2014 | Ravi ...................... | E21B 33/14 166/253.1 |
| 9,267,925 B2* | 2/2016 | Bartuli .................. | G01N 29/12 |
| 9,389,335 B2* | 7/2016 | Jacobson ............... | G01V 5/105 |
| 2005/0052948 A1* | 3/2005 | Caulfield ............... | G01S 15/04 367/11 |
| 2006/0111872 A1* | 5/2006 | Papadimitriou . | G05B 19/41875 702/185 |
| 2006/0256655 A1* | 11/2006 | Sinha ...................... | G01V 1/50 367/31 |
| 2007/0165487 A1* | 7/2007 | Nutt ........................ | G01V 1/42 367/25 |
| 2009/0290757 A1* | 11/2009 | Mian ...................... | G06T 7/001 382/104 |
| 2009/0294174 A1 | 12/2009 | Harmer et al. | |
| 2012/0075953 A1* | 3/2012 | Chace .................... | G01V 5/101 367/35 |
| 2012/0257475 A1 | 10/2012 | Luscombe et al. | |
| 2012/0287749 A1* | 11/2012 | Kutlik ...................... | G01S 5/18 367/7 |
| 2013/0167628 A1* | 7/2013 | Hull ........................ | E21B 47/117 73/152.58 |
| 2014/0000893 A1 | 1/2014 | Lewis et al. | |
| 2014/0174732 A1 | 6/2014 | Goodwin et al. | |
| 2014/0180592 A1* | 6/2014 | Ravi ...................... | E21B 47/107 702/12 |
| 2014/0182845 A1 | 7/2014 | Roberson et al. | |
| 2014/0367092 A1 | 12/2014 | Roberson et al. | |
| 2015/0034311 A1* | 2/2015 | Tunget .................. | E21B 47/005 166/250.14 |
| 2015/0101802 A1 | 4/2015 | Fuller et al. | |
| 2016/0320318 A1* | 11/2016 | Safinya .................. | G01V 5/125 |
| 2017/0350234 A1* | 12/2017 | Xia ........................ | E21B 47/12 |

OTHER PUBLICATIONS

Nunes et al., Evaluation of Threshold-Based Algorithms for Detection of Spectral Peaks in Audio, 2007, Sociedade de Engenharia de Audio, Artigo de Contresso.

* cited by examiner

10,982,532 B2

METHOD AND APPARATUS FOR IDENTIFYING FLUIDS BEHIND CASING

BACKGROUND

Completing an oil or gas well often includes a cementing procedure to allow well casings lining a wellbore to be bonded to the formation. During this procedure, cement slurry is pumped downhole into the wellbore casing and subsequently returned uphole via a wellbore annulus defined between the wellbore casing and a wall of the wellbore. The cement slurry displaces other fluids as it travels in the casing and the annulus. In reverse-cementing operations, the cement is instead pumped into the annulus and then back up to the surface location via the interior of the casing.

A successful placement of cement slurry within the wellbore annulus covers subterranean fluid zones for efficiently and safely producing hydrocarbons from the well. After placement, the cement slurry undergoes a hydration reaction during which the cement slurry transforms from a liquid state to a solid state. Monitoring the placement of the cement slurry and its transition from liquid to solid may help determine when the cement slurry has cured and is ready for subsequent well operation. This could result in good cement quality, enhanced mud removal, increased well integrity, and in time and cost savings.

Solidified cement slurry forms a cement sheath, which is subjected to stresses from the subsequent well operations. Monitoring the integrity of the cement sheath after the cement slurry has cured also helps produce the well safely and economically, and helps in modifying the downhole operations to optimize well production. For example, a hydraulic fracturing operation can be monitored, assessed, and modified as needed to ensure correct placement of the fractures. As another example, if water is detected in the near wellbore zone, then perforations close to the zone may be automatically shut-off in a total automatic completion installation.

Presently, no technique is available for downhole monitoring of the drilling fluid removal from the annulus, cement slurry placement and subsequent well integrity. Some of the existing techniques disclose placing electronic devices behind casing to monitor fluid and cement flow during and after a cementing operation. In these techniques, the electronic devices obtain measurement data from radio frequency identification (RFID) tags dispersed in cement or mud as these fluids flow in the annulus. In other cases, the electronic devices measure the dielectric properties of fluids flowing in the annulus.

These measurements are based on emitting high frequency electromagnetic (EM) wave energy into the fluids in the annulus. The high frequency EM waves experience high attenuation in wellbore fluids, such as water-based mud and cement slurry. Consequently, the depth of investigation of devices using high frequency EM waves is typically shallow. Furthermore, to overcome the energy loss, more power is required to transmit the EM energy into fluids to increase the depth of investigation. Since there is no readily available energy source behind casing, this power requirement constrains the design and operation of active electronic devices behind casing.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to the field of production of hydrocarbons from wellbores and, more particularly, to apparatus and method for identifying fluids behind wellbore casing.

The present disclosure provides for an apparatus and method that does not require RFID or other electronic tags in the fluids in the annulus to determine cement progression. Rather, the present disclosure provides for passive listening devices that have reduced power consumption requirements. These devices may also access calibration data and compare the measured acoustic response of one or more materials in an annular defined in the wellbore with the calibration data using relatively simple comparison techniques. As a result, the presently described measurements are relatively easier to obtain as compared to measurements obtained using RFID tags and electromagnetic (EM) dielectric spectroscopic measurements.

Figure 1A:
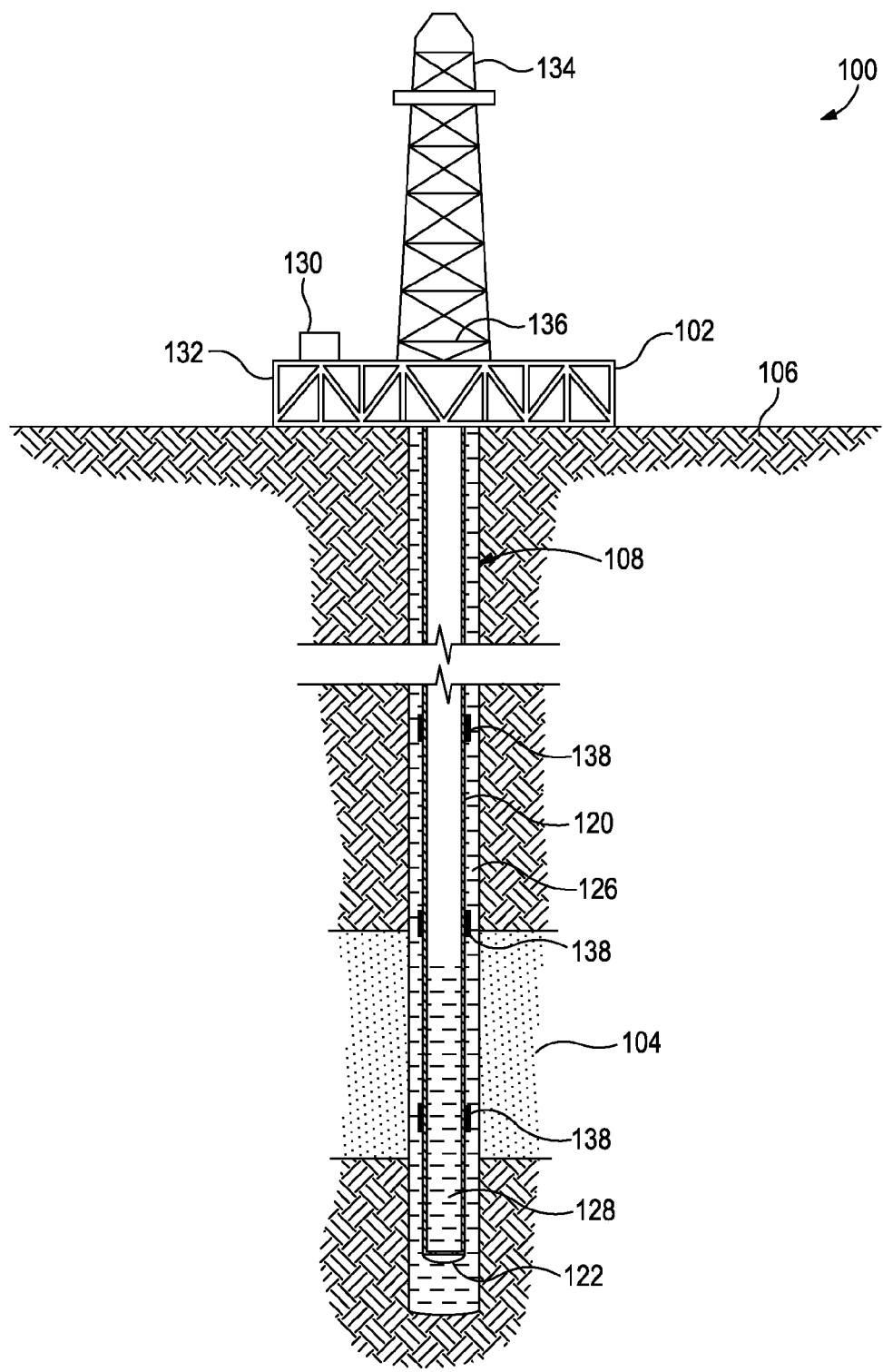
FIG. 1A illustrated is an exemplary drilling system.

Referring to FIG. 1A, illustrated is an exemplary well system 100 that may employ the principles of the present disclosure. It should be noted that while FIG. 1A generally depicts a land-based well system, those skilled in the art will readily recognize that the principles described herein are equally applicable to subsea applications that employ floating or sea-based platforms and rigs, without departing from the scope of the disclosure. A wellbore 108 has been drilled through the various earth strata, including the formation 104. While shown as extending vertically from the surface 106, in other examples the wellbore 108 may be deviated, horizontal, or curved over at least some portions of the wellbore 108. During a drilling operation, one or more pumps 130 (e.g., a mud pump) may circulate drilling fluid 128 downhole through the interior of a drill pipe and through one or more orifices in the drill bit attached to the distal end of the drill pipe. The pumps 130 may circulate a variety of other wellbore compositions (e.g., spacer fluids or cement) into the well during or after the drilling operation, and includes a pressure measurement device that provides a pressure reading at the pump discharge. The drilling fluid 128 may then be circulated back to the earth's surface 106.

A rig 102 is centered over a subterranean oil or gas formation 104 located below the earth's surface 106. The rig 102 includes a work deck 132 that supports a derrick 134. The derrick 134 supports a hoisting apparatus 136 for raising and lowering pipe strings such as casing 120. Upon completion of wellbore drilling, the drill string and drill bit are removed from the wellbore, and the casing 120 is lowered into the wellbore 108. The casing 120 is a string of interconnected pipes or tubulars that extends down the wellbore 108 and facilitates the production of oil and gas from the formation 104. An annulus 126 is defined between the casing 120 and the wall of wellbore 108. A casing shoe 122 is typically attached to the end of the string of casing 120 and guides the casing 120 toward the center of the hole and minimizes problems associated with hitting rock ledges or washouts in the wellbore 108 as the casing 120 is lowered downhole.

Multiple acoustic sensors 138 may be placed at various locations on the outer surface of the casing 120, as required by design and application. The acoustic sensors 138 may be configured to measure and record the acoustic signature of fluids flowing in the annulus 126. In an embodiment, the acoustic sensors 138 may include electronic sensors such as hydrophones, piezoelectric sensors, piezoresistive sensors, electromagnetic sensors, accelerometers, or the like. In another embodiment, the acoustic sensors 138 may be fiber optic sensors such as point sensors (e.g., fiber Bragg gratings, etc.) distributed at desired or predetermined locations along the length of an optical fiber. In yet another embodiment, the acoustic sensors 138 may be distributed acoustic sensors, which may also use optical fibers and permit a distributed measurement of local acoustics at any given point along the fiber. In such embodiments, the optical fiber may be secured to the casing 120 or otherwise conveyed into the wellbore 108 via wireline (not expressly illustrated). In still another embodiment, the acoustic sensors 138 may include optical accelerometers or optical hydrophones that have fiber optic cablings.

Figure 1B:
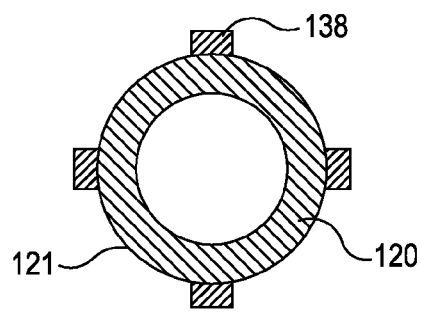
FIG. 1B illustrates a plan view of an exemplary radial array of acoustic sensors of FIG. 1A on the outer surface of the casing.

The placement of the acoustic sensors 138 may be based on sensor design and application. FIG. 1B, for example, illustrates a plan view of an exemplary radial array of acoustic sensors 138 on the outer surface of the casing 120. The radial array configuration includes four acoustic sensors 138 positioned approximately ninety degrees relative to each other on the outer radial surface 121 of the casing 120. Accordingly, each acoustic sensor 138 can acquire independent flow noises at different angular locations. Such a configuration may be beneficial in instances of highly deviated or horizontal wells, where heavier fluid may flow near the bottom of the casing while lighter fluid may flow near the top. Thus, the sensor array is sensitive to azimuthally, non-symmetric flows. It will be understood that the sensor type, sensor placement, and the number of acoustic sensors 138 is merely an example and these can be varied as required.

In the case of fiber optic sensors, a number of distributed optical fiber sensing methodologies may be used to determine the fluid of interest in the annulus 126, without departing from the scope of the present disclosure. Typically, an optical fiber including point sensors or used as a distributed acoustic sensor is optically coupled with (i.e. in optical communication with) a narrow-band electromagnetic radiation source, such as a narrow-band laser or the like located on the earth's surface 106. The laser may be used to produce short pulses of light that are launched into the optical fiber and a fraction of the backward scattered light that falls within the angular acceptance cone of the optical fiber in the return direction, i.e., towards the laser source, may be guided back to the launching end of the fiber as a backscattered signal.

The backscattered signal can result from impurities of the fiber, areas of different refractive index in the fiber generated in the process of fabricating the fiber, interactions with the surfaces of the optical fiber, and/or connections between the fiber and other optical fibers or components. Some of the backscattered electromagnetic radiation is treated as unwanted noise and steps may be taken to reduce such backscattering. The backscattered signal may be used to provide information regarding the time varying state of strain along the optical fiber, which may be equated to locations where fluctuations in noise (vibration) is occurring. A detector, such as an optoelectronic device, may be in optical communication with the optical fiber and used to convert the backscattered electromagnetic signals to electrical signals, and a signal processor may process the electrical signals to determine the magnitude of the strain assumed by the optical fiber downstream of the detector.

Two principles of measurement for distributed sensing technology are Optical Time Domain Reflectometry (OTDR) and Optical Frequency Domain Reflectometry (OFDR). OTDR detects and analyzes coherent Rayleigh backscattering signals generated from narrow laser pulses generated by a laser, sent into the optical fiber. Based on the time it takes the backscattered light to return to an associated detector, it is possible to locate the location of a change in the characteristics of the optical fiber. OFDR provides information on the local characteristic only when the backscattered signal detected during the entire measurement time is measured as a function of frequency in a complex fashion, and then subjected to Fourier transformation. The essential principles of OFDR technology are the quasi continuous wave mode employed by the laser and the narrow-band detection of the optical backscattered signal.

Figure 1C:
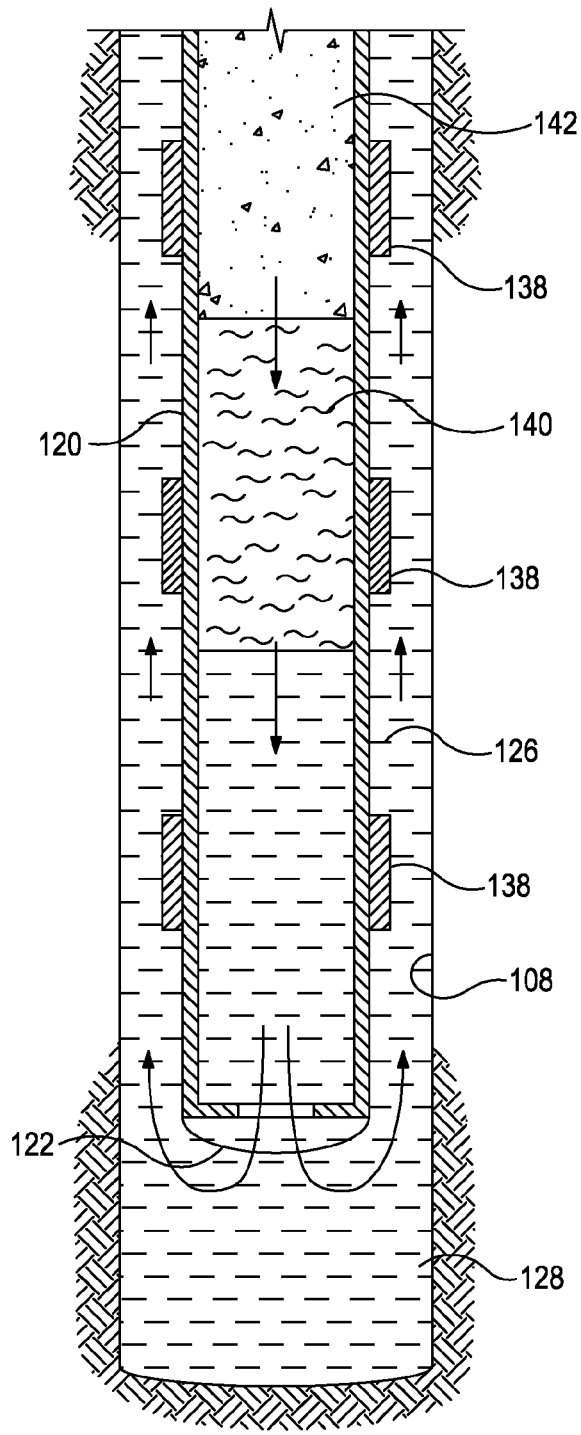
FIG. 1C illustrates displacement of the drilling fluid with placement of a spacer fluid and cement slurry through the casing in FIG. 1A.

FIG. 1C is an enlarged schematic view of a portion of the well system 100 of FIG. 1A. After the wellbore 108 has been drilled, the casing 120 is run into the wellbore 108, which may still be wholly or partly filled with drilling fluid 128. The casing 120 may then be secured within the wellbore 108 by pumping a cement slurry 142 down through the casing 120 and into the annulus 126, as generally indicated by the arrows in FIG. 1C. To accomplish this, the drilling fluid 128 may be displaced from the wellbore 108 using a spacer fluid 140 followed by the cement slurry 142. In some embodiments, the spacer fluid 140 may be a treatment fluid comprising kiln dust and water, but may alternatively comprise other fluids, such as fresh water, brine, or another inexpensive fluid. The spacer fluid 140 may be pumped into the casing 120 and thereby hydraulically force the drilling fluid 128 out of the casing 120 and into the annulus 126 via the casing shoe 122. Forcing the drilling fluid 128 into the annulus 126 also removes dehydrated/gelled drilling fluid and/or filter cake solids from the wellbore 108 in advance of the cement slurry 142.

As illustrated, the spacer fluid 140 may also separate the drilling fluid 128 from the cement slurry 142. The cement slurry 142 may be introduced into the casing 120 behind the spacer fluid 140 and may flow down the casing 120 and up the annulus 126 to form the cement sheath that secures the casing 120 to the wellbore 108.

As the drilling fluid 128, the spacer fluid 140, and the cement slurry 142 flow in the annulus 126, the dynamic pressure of the flow can result in small pressure fluctuations that can be monitored using the acoustic sensors 138. The dynamic pressure may be many orders of magnitude less than the static pressure in the absence of the flow. The dynamic pressure $\Delta p$ is related to the acoustic noise generated by the fluid flow and is measureable. Specifically, the dynamic pressure $\Delta p$ is directly proportional to the root-mean-square of the acoustic signal y as $\Delta p \propto RMS(y)$.

For water flow, the dynamic pressure is related to fluid velocity in a pipe through the relation, $\Delta p \propto \rho \cdot \bar{u}^2$, where $\rho$ is fluid density, and $\bar{u}$ is the average fluid flow velocity. For fluids other than water, the functional form $\Delta p \propto \rho \cdot \bar{u}^2$ may be a relatively complex expression relating the dynamic pressure to the density, fluid speed, and viscosity, and may generally be represented as $\Delta p = f(\rho, u, \mu)$. This expression may be obtained with laboratory results and/or may be represented as an equation or as a look-up table.

Any fluid flow in the annulus 126 during cement slurry placement, cement curing, and the life of the well can be determined based on the analysis above. For instance, during cement slurry placement, the drilling fluid 128, the spacer fluid 140, and the cement slurry 142 in the annulus 126 will each emit a unique acoustic signature that is detected by the acoustic sensors 138. Based on the detected acoustic signature, the location of the drilling fluid 128, the spacer fluid 140, and the cement slurry 142 in the annulus 126 is determined.

During curing, the cement slurry 142 transitions from a liquid to a solid cement sheath. During transition, the viscosity of the cement slurry 142 changes with time, and this results in a change in the acoustic signature of the cement slurry 142. Monitoring the acoustic signature of the cement slurry 142 as it transforms from a liquid to a solid may help in determining the timing of subsequent well operations such as drilling, completions, production, etc.

The cement sheath in the annulus 126 may develop cracks during the life of the well. This may be due to the expansion and contraction of the casing or due to wellbore operations. During cracking, a cracking noise having a distinct acoustic signature is generated by the cement sheath. The acoustic sensors 138 detect the acoustic signature from the cracking noise and the location of the crack in the cement sheath can be determined. Flow paths may be created in the cracked cement sheath and/or any micro-annulus. Any fluid flow in the flow paths will also have a unique acoustic signature, which is sensed by the acoustic sensors 138. From the unique acoustic signature, the location of the flow path and the crack in the cement sheath can be determined. The acoustic signature can also be used in determining creation of any micro-annulus.

During well abandonment procedures, any producing zones in the well can be identified from the acoustic signatures and sealed. Any zones that are communicating are identified and remedied. Based on the acoustic signatures, it may also be possible to determine any fluid entering the annulus 126 from the formation 104. The incoming fluid will result in a change in the acoustic signatures, thereby providing the location of the fluid leak. Remedial jobs may then be performed to prevent fluid influx from the formation 104.

It will therefore be understood that acoustic responses of any material located in the annulus 126 (also referred herein to as an annular material) can be monitored based on the embodiments described herein. In some embodiments, the annular material may be the drilling fluid 128, the spacer fluid 140, and the cement slurry 142. In other embodiments, the annular material may include the cement slurry in various stages of phase transition from liquid to gel to solid as the cement slurry 142 cures in the annulus 126. In yet other embodiments, the annular material may include the solid cement sheath in the annulus 126. In still other embodiments, the annular material may include a cracked or deformed cement sheath having one or more flow paths. In one or more embodiments, the annular material may be any formation fluid. In one or more other embodiments, the annular material may include fluid (including gas) that is flowing from the formation 104 towards the wellbore 108. The acoustic sensors 138 sense the acoustic signature of such a fluid near wellbore 108, and thus determine whether a fluid has reached near wellbore 108 that is not expected during the life of the well. This may prevent the production of unwanted fluids through remediation and/or closing of perforations. This can be done through either intervention or automatic process, or a combination thereof.

Figure 2:
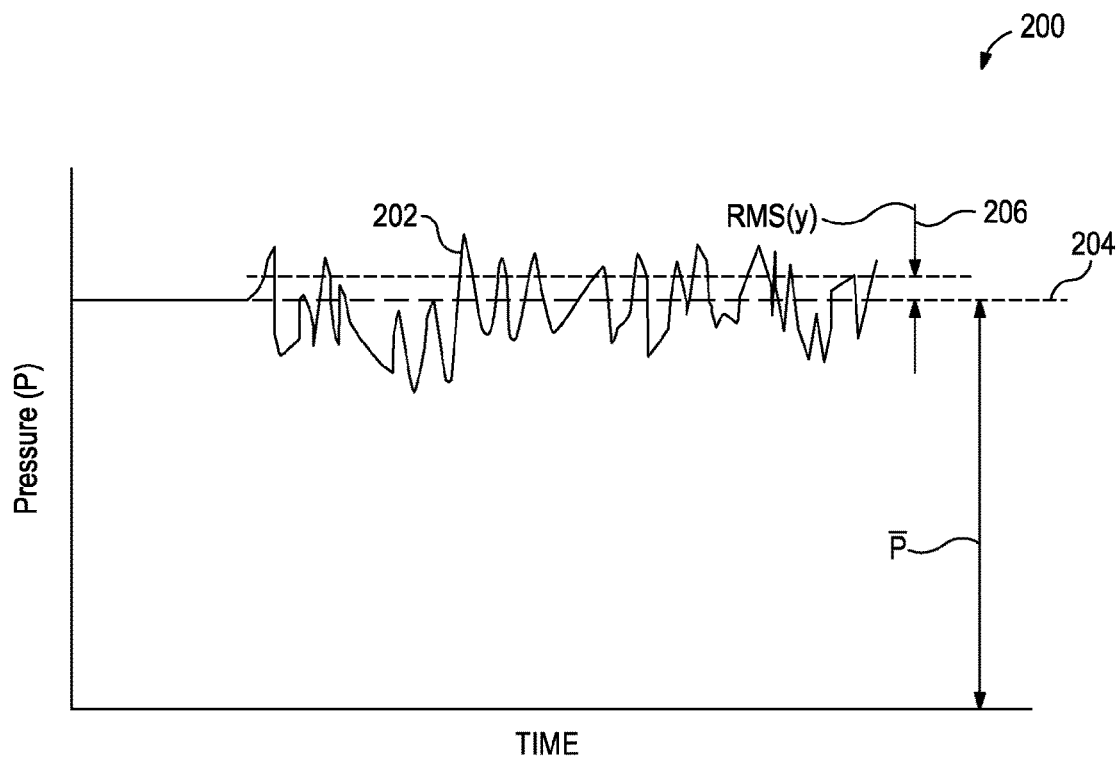
FIG. 2 is a graph depicting acoustically sensed pressure fluctuations with respect to time.

FIG. 2 is a graph 200 depicting acoustically sensed pressure fluctuations 202 with respect to time. Line 202 represents the time-dependent pressure P. The time-dependent pressure P will fluctuate due to eddies generated within the flowing fluid. An average pressure $\bar{P}$ can be determined, and is shown as line 204. The dynamic pressure $\Delta p$ can be determined based on $\Delta p = P - \bar{P}$. Shown at measurement 206, RMS(y) is the root-mean-square of the dynamic pressure $\Delta p$.

The mean of the dynamic pressure $\Delta p$ can be zero, while the root-mean-square of the pressure fluctuations may not be zero. If the relationship $\Delta p = f(\rho, u, \mu, \text{etc.})$ between dynamic pressure, or equivalently RMS(y), and the fluid parameters and fluid speed is known, then the fluid density should be solvable either analytically or computationally given the other parameters in the equation.

As an illustrative example, consider a fluid that follows the same relation as that for water, with $\Delta p = K \cdot \rho \cdot \bar{u}^2$. If the flow rate is known, such as if the flow rate is measured while entering the wellbore or controlled through surface equipment, density of the fluid can be estimated as $$\rho = K \cdot \frac{RMS(y)}{u^2}, \qquad \text{Equation 1}$$

where K is a proportionality constant, u is the known flow rate, $\rho$ is the density of the fluid, and RMS(y) is the root-mean-square of the measured acoustic signal. The proportionality constant K can be dependent on the type of fluid and mechanical features of the well, which can be determined through a calibration procedure using fluids of known density. For fluids with a more complex expression relating the dynamic pressure to the flow speed, density, and viscosity, etc., the density can be estimated analytically or computationally. It should be noted that Equation 1 is merely an example and that the relationship may be expressed using other equations as well.

Figure 3:
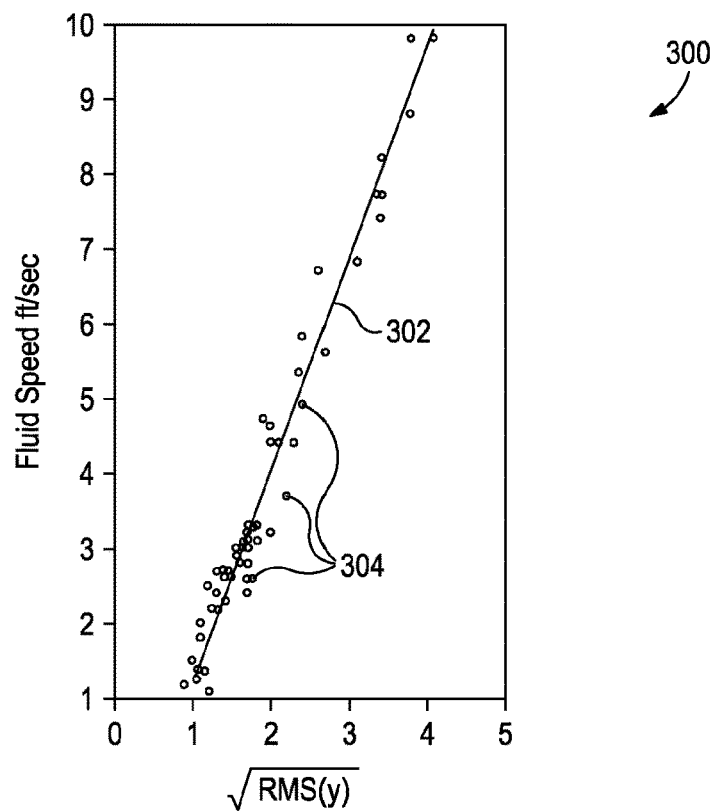
FIG. 3 illustrates a plot that depicts fluid speed against the square root of the root mean square of the acoustic signal measured under different operating conditions.

For Equation 1, Assuming the fluid speeds are the same at a particular point in the annulus 126 and the viscosity of the different fluids is the same, then the relative density of the different fluids can be measured as $$\rho_2 = \rho_1 \frac{RMS(y_1)}{RMS(y_2)}, \qquad \text{Equation 2}$$

where $\rho_1$, $\rho_2$ are the density values of a first fluid and a second fluid, respectively, and $RMS(y_1)$, $RMS(y_2)$ are the root-mean-squares of the measured acoustic signals from the first fluid and the second fluid, respectively. An increase in viscosity results in a reduction in the acoustic fluctuations or broadband acoustic power. These responses can be calibrated in a laboratory for the fluids of interest at the representative fluid speeds. FIG. 3 illustrates a plot 300 that depicts fluid speed against the square root of the root mean square of the acoustic signal measured under different operating conditions. In the plot 300, the acoustic signal is plotted against the variations in the fluid flow rate, as indicated by sample points 304. As seen, the equal distribution of the sample points about the line 302 indicates a linearly varying relationship between the fluid flow rate and the acoustic signal.

Figure 4:
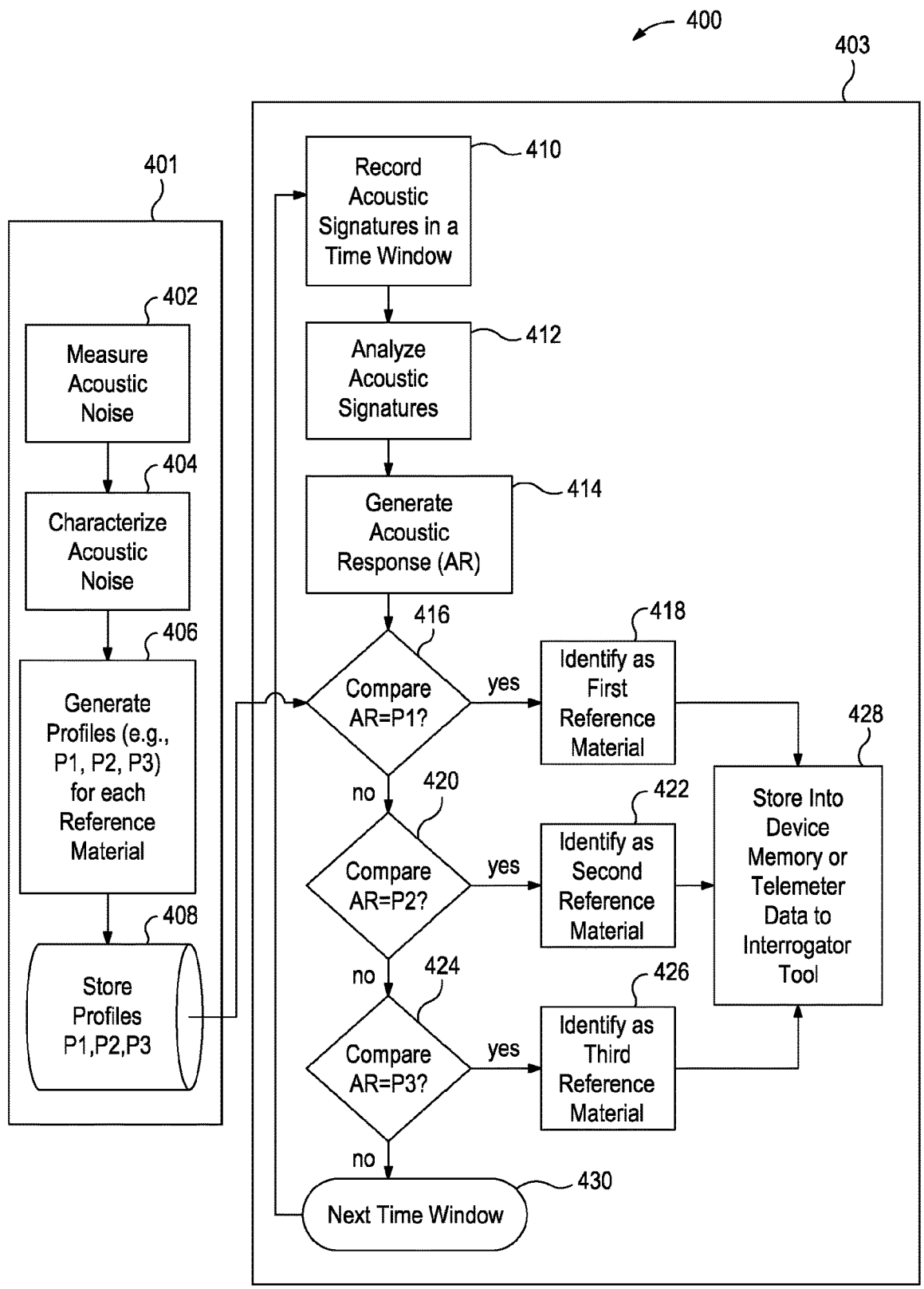
FIG. 4 illustrates a flowchart of a method of determining a fluid type.

FIG. 4 is a schematic flowchart of a method 400 for determining a type of annular material. As illustrated, the method 400 includes a first stage 401 and a second stage 403. The first stage 401 involves a process of calibrating the acoustic sensors 138 (FIG. 1A). As used herein, the acoustic sensors 138 may be one or more of the electronic sensors disclosed above. The first stage 401 may be carried out prior to the cementing operation either in a laboratory before installing the acoustic sensors 138 in the wellbore 108 (FIG. 1C) or may be carried out during casing run-in. The second stage 403 involves identifying and otherwise characterizing the type of annular material during and after the cementing operation.

In stage 401, acoustic noise generated by one or more reference materials is measured, as at 402. In some embodiments, the reference materials may be the drilling fluid 128 (FIG. 1C), the spacer fluid 140 (FIG. 1C), and the cement slurry 142 (FIG. 1C). In other embodiments, the reference materials may include the cement slurry in various phases as it transitions from a liquid state to solid state. In yet other embodiments, the reference material may be a solidified cement sheath. In yet other embodiments, the reference materials may include fluids that may flow from the formation 104 towards the wellbore 108 (for instance, fluids that flow into the annulus 126) during the life of the well. It will be understood that the reference materials are not limited to the above-mentioned materials and may include any annular material that is introduced or formed in the annulus 126 defined in the wellbore 108. The measured acoustic noise may then be characterized, as at 404. More particularly, every material generates a distinct acoustic noise that depends on one or more of a flow rate, a density, a type, a viscosity, and a phase of the material. During characterization, analytic expressions (e.g., Equations 1 and 2, above) or look-up tables are used to correlate the type of reference material, and one or more experimentally measured parameters (e.g., acoustic power) can be extracted using standard data analysis techniques, machine learning, or optimization algorithms such as genetic algorithms. The characterization results in an acoustic profile obtained over a desired period of time for each reference material, as at 406. Each acoustic profile may represent a variation in the one or more measured parameters over a desired time period. One or more of a flow rate, a density, a viscosity, and a phase of the reference materials may be varied to create different acoustic profiles of the same reference material. The acoustic profiles may be stored (for instance, in a lookup table) in a non-volatile memory of each acoustic sensor 138, as at 408. Alternatively, the acoustic profiles may be stored at a surface location, for instance in a database located at a central computing facility. In some embodiments, analytic expressions (e.g., Equations 1 or 2, above) used for creating the different acoustic profiles may be stored and the different acoustic profiles may be generated in real time during operation. For the sake of explanation, it is assumed that three profiles P1, P2, and P3 are generated in the calibration stage 401. However, it will be understood that the number of acoustic profiles generated can be more or less than three.

In the second stage 403, one or more annular materials may be characterized (or identified) during or after a cementing operation. The second stage 403 may also include characterizing the one or more annular materials during the life of the well. The one or more annular materials may include the drilling fluid 128, the spacer fluid 140, the cement slurry 142, the cement slurry 142 in various phases as it transitions from a liquid phase to a solid phase, and solid cement sheath. During the cementing operation, the acoustic sensors 138 record the acoustic signatures of the annular materials flowing through the annulus 126, as at 410. In an example, the acoustic sensors 138 may record the acoustic signatures over a predetermined time window (e.g., 1-2 minutes). One or more processors communicably coupled to each acoustic sensor 138 analyze the recorded acoustic signatures, as at 412. The one or more processors may either be located on-board each acoustic sensor 138 or may be located at a surface location. The analysis may include frequency content analysis from Fast Fourier Transform (FFT), power spectral analysis, acoustic power analysis, or the like. The one or more processors generate an acoustic response based on the analysis, as at 414.

The acoustic response may then be compared or otherwise matched with the acoustic profiles, as at 416, 420, and 424. In some embodiments, for instance, the acoustic response may be compared sequentially with the acoustic profiles. Accordingly, the acoustic response is initially compared with acoustic profile P1, as at 416. If the acoustic response matches the acoustic profile P1, the annular material is identified as the first reference material (corresponding to the acoustic profile P1), as at 418, and the result is stored in the on-board memory of the acoustic sensor 138, as at 428. The result may thus be retrieved later using an intervention tool. Alternatively, at 428, the result may be communicated in real time to the surface 106 using a variety of telecommunication means such as, but not limited to, electromagnetic telemetry, acoustic telemetry, fiber optic telemetry, wired or wireless signals, or any combination thereof.

If the acoustic response does not match the acoustic profile P1, the acoustic response may then be compared with the acoustic profile P2, as at 420. If the acoustic response matches the acoustic profile P2, the annular material is identified as the second reference material (corresponding to the acoustic profile P2), as at 422, and the result is stored in the memory of the acoustic sensor 138, as at 428. Alternatively, as indicated above, the result may be communicated to the surface 106 in real time using one or more telecommunication methods.

If the acoustic response does not match the acoustic profile P2, the acoustic response may then be compared against the acoustic profile P3, as at 424. If the acoustic response matches the acoustic profile P3, the annular material is identified as the third reference material (corresponding to the acoustic profile P3), as at 426, and the result is stored in the memory of the acoustic sensor 138, as at 428. Alternatively, the result may be communicated to the surface 106 in real time using one or more telecommunication methods, as mentioned above. The method 400 then repeats, as at 430, wherein the acoustic sensors 138 may record the acoustic signatures of fluids flowing in the annulus 126 in the next time window.

A unique identifier is assigned to each acoustic sensor 138 and is correlated to the location (depth) of each acoustic sensor 138 in the annulus 126. Thus, the location of the different annular materials identified in the annulus 126 can be inferred from the unique identifier.

It will be readily understood that the number of annular materials and the types of annular materials mentioned above are merely examples and are not limited thereto. For instance, the acoustic sensors 138 may be calibrated with the profiles of other materials, such as, hydrocarbons, oils, water (fresh or salt-based), cleaning fluids, chemical washes, or the like. Additionally, the number of materials may increase or decrease as per requirement.

In an example, the acoustic sensors 138 may record the acoustic signature of a mixed flow during a time window. A mixed flow may refer to a flow including a mixture of two or more types of annular materials. Thus, the response generated from such a mixed flow will not match any of the acoustic profiles. Because the acoustic signature is dependent on the flow rate of the annular material, the different flow rates may be extracted from the acoustic response. The flow rates may be extracted either by the one or more processors on-board the acoustic sensors 138 or the flow rates may be transmitted to a surface location for processing. Based on the flow rates, the type of annular materials in the mixed flow may be determined.

Figure 5A:
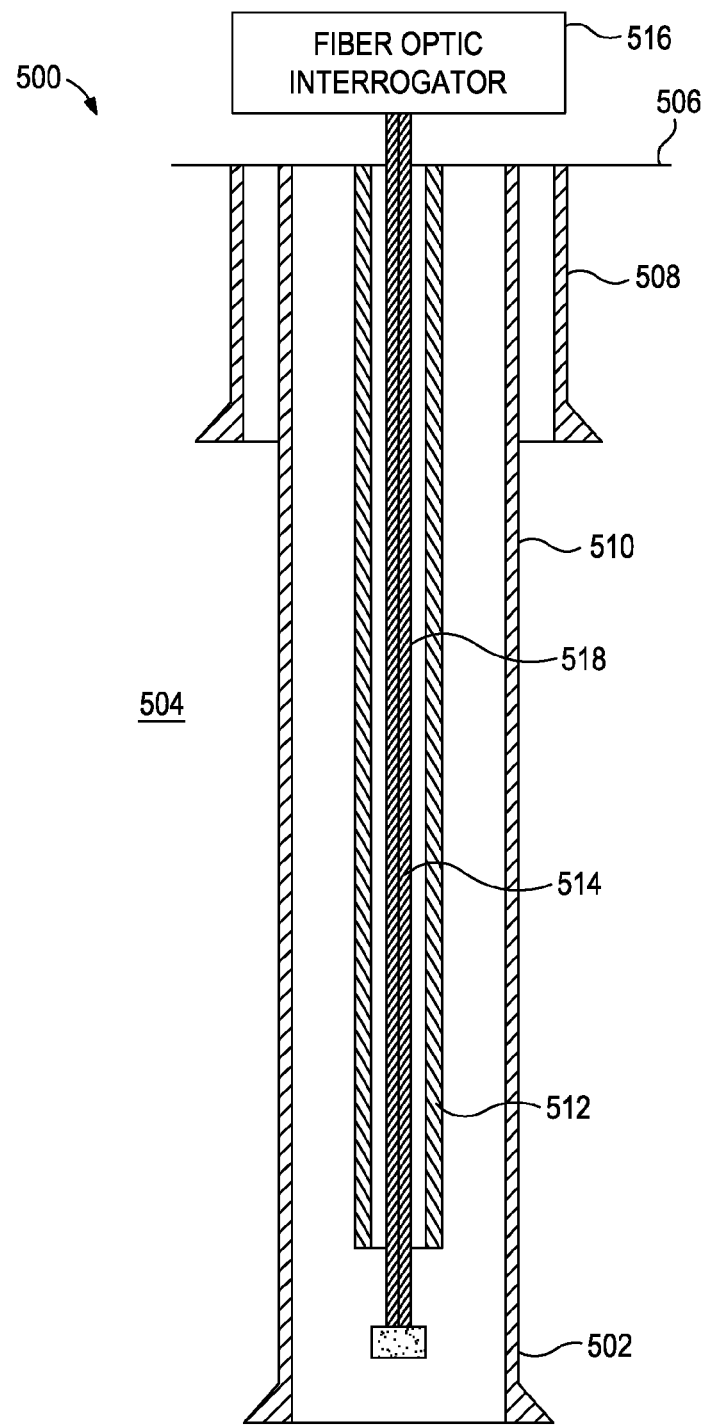
FIG. 5A illustrates an example of a wellbore system including fiber optic sensors.

FIG. 5A illustrates an example wellbore system 500 including fiber optic sensors. The system 500 can include a wellbore 502 that penetrates a subterranean formation 504. The wellbore 502 may be drilled into the subterranean formation 504 using any suitable drilling technique. While shown as extending vertically from the surface 506 in FIG. 5A, in other examples the wellbore 502 may be deviated, horizontal, or curved over at least some portions of the wellbore 502. The wellbore 502 can include a surface casing 508, a production casing 510, and tubing 512. Portions of the wellbore 502 may alternatively be un-cased or "open hole." The tubing 512 can extend from the surface 506 in an inner area defined by the production casing 510. The tubing 512 may be production tubing through which hydrocarbons or other fluid can enter and be produced to the surface 506.

Although not illustrated for simplification, the wellbore system 500 may include a servicing rig, such as a drilling rig, a completion rig, a workover rig, other mast structure, or a combination of these. In some aspects, the servicing rig may include a derrick with a rig floor. In subsea operations, piers extending downwards to a seabed in some implementations may support the servicing rig. Alternatively, the servicing rig may be supported by columns sitting on hulls or pontoons (or both) that are ballasted below the water surface, which may be referred to as a semi-submersible platform or rig. In an off-shore location, a riser may extend from the servicing rig to exclude sea water and contain drilling fluid returns. There may also be a wellhead present on top of the well at the surface. Other mechanical mechanisms that are not shown may control the run-in and withdrawal of a workstring in the wellbore 502. Examples of these other mechanical mechanisms include a draw works coupled to a hoisting apparatus, a slickline unit or a wireline unit including a winching apparatus, another servicing vehicle, and a coiled tubing unit.

The wellbore system 500 includes a fiber optic acoustic sensing subsystem that can detect noise or other vibrations in the wellbore 502, such as during a cementing operation. The fiber optic acoustic sensing subsystem includes a fiber optic interrogator 516 located at the surface 506 and one or more fiber optic cables 514 communicatively coupled to the fiber optic interrogator 516. The fiber optic cables 514 can include multiple sensors, such as point sensors located at different zones of the wellbore 502, or may alternatively operate as a distributed acoustic sensing cable. The fiber optic cables 514 can be located on a retrievable wireline 518. The fiber optic cables 514 can contain single mode optical fibers, multi-mode optical fibers, or multiple fibers of multiple fiber types. The fiber optic cables 514 can each contain one or more single mode fibers, one or more multi-mode fibers, or a combination thereof.

The interaction of the fiber optic cable 514 with the noise or other vibrations from the wellbore 502 produces a strain in the fiber optic cable 514. During operation, fiber optic interrogator 516 injects a beam of highly coherent light, such as a laser pulse, in the fiber optic cable 514. The strain change in the fiber optic cable 514 causes a difference in path length of light injected by the fiber optic interrogator 516. The path length difference causes an optical phase shift in the backscattered light. The phase shift is detected the fiber optic interrogator 516 using various interferometry techniques to determine the location of the strain and therefore the location of the annular material in the wellbore 106.

Figure 5B:
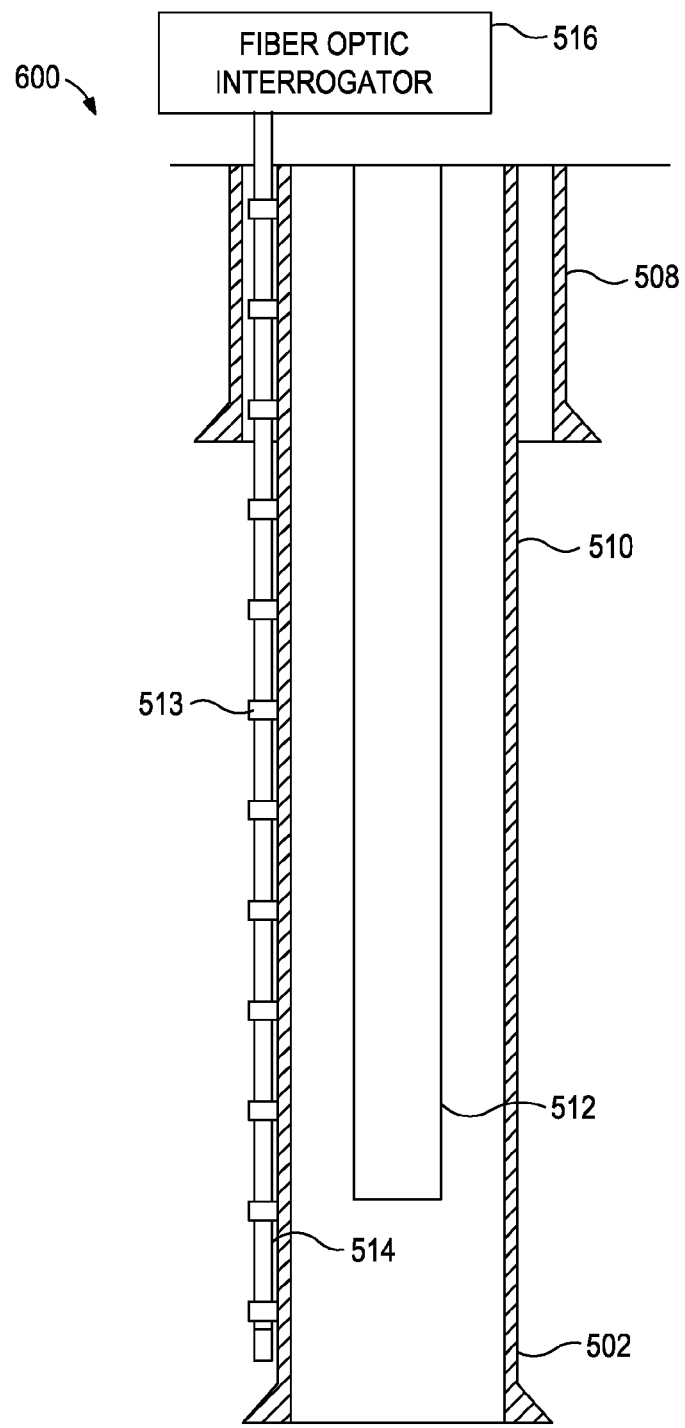
FIG. 5B illustrates another example of a wellbore system including fiber optic sensors.

FIG. 5B illustrates another example wellbore system 600 that includes fiber optic sensors. The wellbore system 600 may be similar in some respects to the wellbore system 500 of FIG. 5A and therefore may be best understood with reference thereto, where like numerals represent like elements not described again. Unlike the wellbore system 500, one or more fiber optic cables 514 (one shown) are located external to the production casing 510. As illustrated, the fiber optic cable 514 can be coupled to the tubing 512 by casing clamps 513. In some embodiments, the casing clamps 513 are cross-coupling protectors located at every other joint of the tubing 512. The operation of the wellbore system 600 is similar to the operation of the wellbore system 500 described above and is not repeated herein for the sake of brevity.

Figure 6:
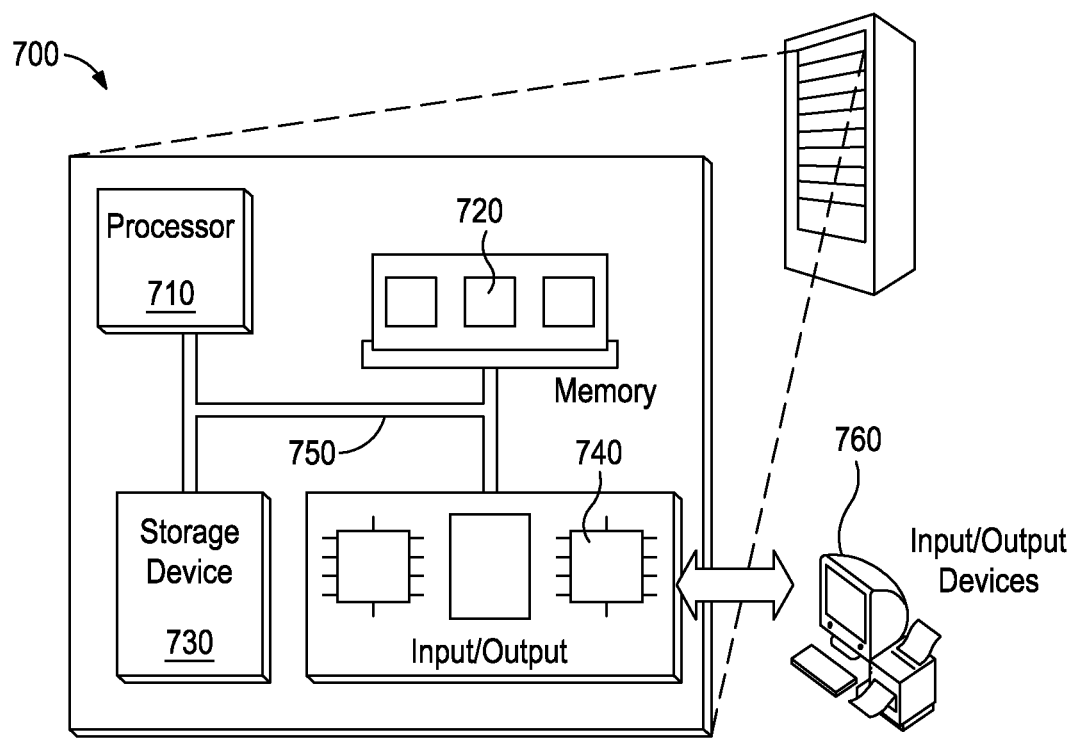
FIG. 6 illustrates an exemplary processing system for determining a type of annular material and/or performing other tasks disclosed herein.

FIG. 6 illustrates an exemplary processing system 700 for determining a type of annular material. For instance, the system 700 may process data received from the one or more sensors 138 in FIGS. 1A-1C, configure and/or control the fiber optic interrogator 516 in FIGS. 5A-5B, may implement the method 400 disclosed above, or perform other tasks as described herein.

The system 700 may include a processor 710, a memory 720, a storage device 730, and an input/output device 740. Each of the components 710, 720, 730, and 740 may be interconnected, for example, using a system bus 750. The processor 710 may be processing instructions for execution within the system 700. In some embodiments, the processor 710 is a single-threaded processor, a multi-threaded processor, or another type of processor. The processor 710 may be capable of processing instructions stored in the memory 720 or on the storage device 730. The memory 720 and the storage device 730 can store information within the computer system 700.

The input/output device 740 may provide input/output operations for the system 700. In some embodiments, the input/output device 740 can include one or more network interface devices, e.g., an Ethernet card; a serial communication device, e.g., an RS-232 port; and/or a wireless interface device, e.g., an 802.11 card, a 3G wireless modem, or a 4G wireless modem. In some embodiments, the input/output device can include driver devices configured to receive input data and send output data to other input/output devices, e.g., keyboard, printer and display devices 760. In some embodiments, mobile computing devices, mobile communication devices, and other devices can be used.

In accordance with at least some embodiments, the disclosed methods and systems related to scanning and analyzing material may be implemented in digital electronic circuitry, or in computer software, firmware, or hardware, including the structures disclosed in this specification and their structural equivalents, or in combinations of one or more of them. Computer software may include, for example, one or more modules of instructions, encoded on computer-readable storage medium for execution by, or to control the operation of, a data processing apparatus. Examples of a computer-readable storage medium include non-transitory medium such as random access memory (RAM) devices, read only memory (ROM) devices, optical devices (e.g., CDs or DVDs), and disk drives.

The term "data processing apparatus" encompasses all kinds of apparatus, devices, and machines for processing data, including, by way of example, a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative, or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be executed on one computer or on multiple computers that are located at one site or distributed across multiple sites and interconnected by a communication network.

Some of the processes and logic flows described in this specification may be performed by one or more programmable processors executing one or more computer programs to perform actions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors and processors of any kind of digital computer. Generally, a processor will receive instructions and data from a read-only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer may not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations may be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Embodiments Disclosed Herein Include:

A: A method that includes measuring an acoustic noise generated by one or more reference materials and thereby generating a corresponding one or more acoustic profiles, monitoring an annular material in a wellbore drilled through one or more formations with at least one acoustic sensor positioned in the wellbore and thereby obtaining an acoustic response of the annular material, comparing the acoustic response with the one or more acoustic profiles using a processor communicably coupled to the acoustic sensor, and characterizing the annular material based on the comparison of the acoustic response and the one or more acoustic profiles.

B: A system that includes a fiber optic cable positioned in a wellbore drilled through one or more formations, the fiber optic cable receiving acoustic signals from an annular material in the wellbore and thereby generate an acoustic response of the annular material, and a fiber optic interrogator optically coupled to the fiber optic cable to characterize the annular material based on a comparison between the acoustic response as received by the fiber optic cable and one or more acoustic profiles of a corresponding one or more reference materials.

C: A system that includes an acoustic sensor positioned in a wellbore to receive acoustic signals from an annular material in the wellbore and thereby obtain an acoustic response of the annular material by analyzing an acoustic signature of the annular material, and a processor communicably coupled to the acoustic sensor to characterize the annular material based on a comparison between the acoustic response and one or more acoustic profiles of a corresponding one or more reference materials.

Each of embodiments A, B, and C may have one or more of the following additional elements in any combination: Element 1: wherein monitoring the annular material in the wellbore comprises monitoring at least one of a drilling fluid, a spacer fluid, a cement slurry, and a cement sheath located in an annulus defined by the wellbore, and one or more fluids that flow from the one or more formations towards the wellbore. Element 2: wherein measuring the acoustic noise generated by the one or more references materials comprises measuring the acoustic noise generated depending on one or more of a flow rate, a density, a type, a viscosity, and a phase of the one or more reference materials. Element 3: wherein obtaining the acoustic response of the annular material comprises analyzing an acoustic noise signature of the annular material in the wellbore to obtain the acoustic response. Element 4: wherein the acoustic sensor includes an array of electronic sensors and monitoring the annular material with the at least one acoustic sensor comprises obtaining the acoustic response of the annular material using the array of electronic sensors. Element 5: further comprising obtaining the acoustic response of the annular material during a predetermined time window. Element 6: wherein characterizing the annular material comprises characterizing a type of the annular material, and the method further comprises one of transmitting the type of annular material in real time to a surface location and storing the type of the annular material in the acoustic sensor. Element 7: wherein the acoustic sensor comprises a plurality of acoustic sensors positioned in the wellbore at known locations and the method further comprises assigning a unique identifier to each acoustic sensor of the plurality of acoustic sensors, the unique identifier being correlated to the known location of each acoustic sensor, and determining a location of the annular material in the wellbore based on the unique identifier. Element 8: wherein the one or more acoustic profiles are stored in a memory device included in the acoustic sensor. Element 9: wherein the one or more acoustic profiles are stored at a surface location. Element 10: wherein the processor is located in the wellbore. Element 11: wherein the processor is located at a surface location.

Element 12: wherein the annular material comprises at least one of a drilling fluid, a spacer fluid, a cement slurry, and a cement sheath located in an annulus defined by the wellbore, and one or more fluids that flow from the one or more formations towards the wellbore. Element 13: wherein the one or more acoustic profiles are generated by analyzing acoustic noise generated by the one or more reference materials. Element 14: wherein the noise is generated by one or more of a flow rate, a density, a type, a viscosity, and a phase of the one or more reference materials. Element 15: wherein the one or more acoustic profiles are stored in a database communicably coupled to the fiber optic interrogator. Element 16: wherein the fiber optic cable is secured to a casing positioned within the wellbore. Element 17: wherein the fiber optic cable is positioned on the exterior of the casing. Element 18: wherein the fiber optic cable is positioned within an interior of the casing. Element 19: wherein the fiber optic cable is conveyed into the wellbore via wireline.

Element 20: wherein the one or more acoustic profiles are generated by analyzing acoustic noise generated by the one or more reference materials, and wherein the acoustic noise is generated by one or more of a flow rate, a density, a type, a viscosity, and a phase of the one or more reference materials. Element 21: wherein the acoustic sensor comprises a plurality of acoustic sensors positioned at known locations in the wellbore, and wherein each acoustic sensor is assigned a unique identifier that is correlated to the known location of each acoustic sensor, a location of the annular material in the wellbore being determined based on the unique identifier.

By way of non-limiting example, exemplary combinations applicable to A, B, and C include: Element 13 with Element 14; Element 13 with Element 15; Element 16 with Element 17; and Element 16 with Element 18.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

What is claimed is:

1. A method comprising:
measuring an acoustic noise generated by one or more reference materials and thereby generating a corresponding one or more acoustic profiles and storing the one or more acoustic profiles within at least one acoustic sensor of a plurality of acoustic sensors positioned in a wellbore, wherein the plurality of acoustic sensors comprise separate acoustic sensors, wherein the one or more acoustic profiles are stored within the at least one acoustic sensor before the at least one acoustic sensor is disposed in the wellbore;
monitoring, with the at least one acoustic sensor, noise generated by an annular material that is transitioning from a liquid phase to a gel phase to a solid phase in the wellbore, and obtaining acoustic responses that are based on the noise generated by a phase change of the annular material, wherein the wellbore is drilled through one or more formations;
comparing the acoustic responses with the one or more acoustic profiles using a processor communicably coupled to the acoustic sensor; and
characterizing the annular material based on a comparison of the acoustic responses with the one or more acoustic profiles.

2. The method of claim 1, wherein monitoring the annular material in the wellbore comprises monitoring a cement slurry.

3. The method of claim 1, wherein measuring the acoustic noise generated by the one or more references materials comprises measuring the acoustic noise generated depending on one or more of a flow rate, a density, a type, a viscosity, and a phase of the one or more reference materials.

4. The method of claim 1, wherein obtaining the acoustic responses due to the phase change of the annular material comprises analyzing acoustic noise signatures of the annular material in the wellbore to obtain the acoustic responses.

5. The method of claim 1, further comprising monitoring a cracking of a cement sheath.

6. The method of claim 5, further comprising monitoring a noise generated by a flow of a fluid within a crack of the cement sheath.

7. The method of claim 6, further comprising determining a location of the crack based on the noise generated by the flow of the fluid within the crack of the cement sheath.

8. The method of claim 1, further comprising:
assigning a unique identifier to each acoustic sensor of the plurality of acoustic sensors, the unique identifier being correlated to a known location of each acoustic sensor; and
determining a location of the annular material in the wellbore based on the unique identifiers.

9. The method of claim 1, further comprising determining a creation of a micro-annulus in the wellbore.

10. A system comprising:
a fiber optic cable positioned in a wellbore drilled through one or more formations, the fiber optic cable configured to receive acoustic signals in the wellbore;
a fiber optic interrogator optically coupled to the fiber optic cable and configured to determine a location of strain in the fiber optic cable; and
a processor in communication with the fiber optic interrogator, the processor configured to generate acoustic responses based on noise generated by an annular material that is transitioning from a liquid phase to a gel phase to a solid phase in the wellbore.

11. The system of claim 10, wherein the annular material comprises at least one of a drilling fluid, a spacer fluid, a cement slurry, and a cement sheath located in an annulus defined by the wellbore, and one or more fluids that flow from the one or more formations towards the wellbore.

12. The system of claim 10, wherein the one or more acoustic profiles are generated by analyzing acoustic noise generated by the one or more reference materials.

13. The system of claim 12, wherein the noise is generated by one or more of a flow rate, a density, a type, a viscosity, and a phase of the one or more reference materials.

14. The system of claim 12, wherein the one or more acoustic profiles are stored in a lookup table.

15. The system of claim 10, wherein the fiber optic cable is secured to a casing positioned within the wellbore.

16. The system of claim 10, wherein the processor is further configured to generate acoustic responses that are based on noise generated by a cracking of a cement sheath.

17. The system of claim 10, wherein the processor is further configured to generate acoustic responses that are based on noise generated by a flow of a fluid within a crack of a cement sheath.

18. A system comprising:
a plurality of acoustic sensors positioned in a wellbore to receive acoustic signals in the wellbore; and
a processor communicably coupled to the acoustic sensors, the processor configured to generate acoustic responses based on noise generated by an annular material that is transitioning from a liquid phase to a gel phase to a solid phase in the wellbore and characterize the annular material based on comparisons between the acoustic responses and one or more acoustic profiles of a corresponding one or more reference materials, wherein the one or more acoustic profiles are stored within at least one acoustic sensor, wherein the one or more acoustic profiles are stored within the at least one acoustic sensor before the at least one acoustic sensor is disposed in the wellbore.

19. The system of claim 18, wherein the processor is further configured to generate an acoustic response based on a cracking of a cement sheath that is disposed within the wellbore.

20. The system of claim 18, wherein the plurality of acoustic sensors are positioned at ninety degrees relative to each other on an outer surface of casing that is disposed in the wellbore.

* * * * *